Nov. 10, 1931.   O. W. SIEBERT ET AL   1,830,916
STEERING FORK AND HANDLE FOR CHILDREN'S VEHICLES
Filed Jan. 12, 1931
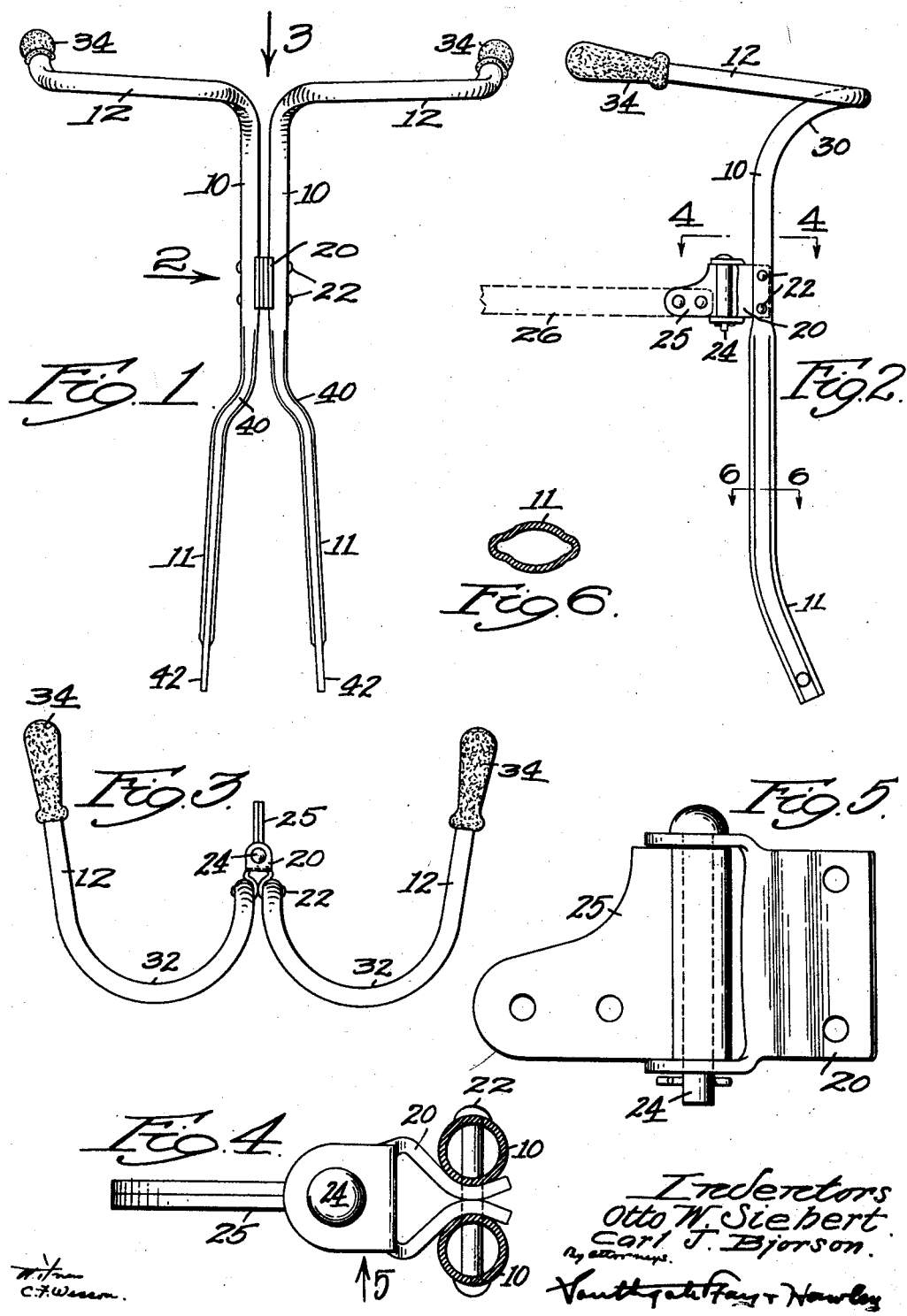

Patented Nov. 10, 1931

1,830,916

UNITED STATES PATENT OFFICE

OTTO W. SIEBERT AND CARL J. BJORSON, OF GARDNER, MASSACHUSETTS, ASSIGNORS TO O. W. SIEBERT COMPANY, OF GARDNER, MASSACHUSETTS, A CORPORATION OF MASSACHUSETTS

STEERING FORK AND HANDLE FOR CHILDREN'S VEHICLES

Application filed January 12, 1931. Serial No. 508,112.

This invention relates to steering forks and handles for children's vehicles and particularly for velocipedes or tricycles.

It is the general object of our invention to provide a combined fork and handle member for such purposes which is formed of a single continuous piece of metal tubing.

In the preferred form, the combined member is of circular cross section in the handle portion, of substantially oval or elliptical cross section in the fork portion, and flattened to a double thickness of metal at the extreme lower end of the fork portion.

A further object of our invention is to provide a combined handle and fork member which may be easily and economically manufactured and which is strong and reliable in use.

Our invention further relates to arrangements and combinations of parts which will be hereinafter described and more particularly pointed out in the appended claims.

A preferred form of the invention is shown in the drawings, in which

Fig. 1 is a front elevation of a complete steering head comprising two forks and two handle portions;

Fig. 2 is a side elevation of the parts shown in Fig. 1;

Fig. 3 is a plan view thereof;

Fig. 4 is an enlarged sectional plan view, taken along the line 4—4 in Fig. 2;

Fig. 5 is an enlarged side elevaton, looking in the direction of the arrow 5 in Fig. 4, and Fig. 6 is a detail sectional view, taken along the line 6—6 in Fig. 2.

Referring to the drawings, we have shown our invention embodied in the steering apparatus of a velocipede or tricycle. The complete steering head comprises a pair of upright members 10 shaped at their lower ends to form forks 11 and at their upper ends to form handle portions 12.

The members 10 are connected to a supporting or bearing bracket 20 in any convenient manner, as by cross pins or rivets 22 (Fig. 4). The bracket 20 is connected by a pivot bolt or stud 24 to a member 25 secured to the front end of a frame 26 (Fig. 2) forming a portion of the rear part of the vehicle.

Each half of the steering head is formed from a single piece of metal tubing, preferably of circular cross section, which circular shape is retained in the upright portion 10 and in the handle portion 12. The handle portion is formed by bending the stock in a forward curve, as indicated at 30 (Fig. 2) and then in a substantially semi-circular horizontal outward and rearward curve, as indicated at 32 in Fig. 3. Grips 34 of the usual type may be applied to the extreme ends of the handles.

Below the bracket 20 the upright members 10 are bent outwardly, as indicated at 40 and then downwardly to form the fork portions 11. These fork portions are also changed in cross section by a press operation from the original circular cross section to the substantially elliptical or oval cross section indicated in Fig. 6, this section being more pleasing in appearance and also much stiffer in a fore-and-aft direction.

The extreme lower ends of the fork portions 11 are flattened, as indicated at 42, to receive the cross shaft or bearings of the steering wheel.

We thus produce a steering head formed of three parts only, namely—two members 10 with integral fork and handle portions and the connecting bracket 20, all of which may be economically manufactured from steel tubing for the members 10 and from sheet metal for the bracket 20.

The combined fork and handle formed as described from a single continuous piece of tubular metal is pleasing in appearance and is entirely free from shoulders or projections in the the surfaces thereof, such as are encountered when this fork and handle member is built up in the usual way from a plurality of separate pieces.

Having thus described our invention and the advantages thereof, we do not wish to be limited to the details herein disclosed, otherwise than as set forth in the claims, but what we claim is:

1. A combined fork and handle for a child's vehicle comprising a single continuous piece of metal tubing having a fork portion of substantially elliptical cross section, and a supporting portion and a handle portion both of substantially circular cross section.

2. A combined fork and handle for a child's vehicle comprising a single continuous piece of metal tubing having a fork portion of substantially elliptical cross section, and a supporting portion and a handle portion, both of substantially circular cross section, said handle portion being continuously curved forwardly, outwardly and rearwardly with respect to said fork and supporting portions.

3. A steering head for a child's vehicle comprising two one-piece tubular combined forks and handles and a connecting bracket to which said combined parts are rigidly secured at intermediate points thereof.

4. A steering head for a child's vehicle comprising a pair of one piece tubular combined fork and handle portions, each of which is formed of a single continuous piece of metal tubing having a fork portion of substantially elliptical cross section, and a supporting portion and a handle portion of substantially circular cross section, and a connecting bracket to which said combined parts are rigidly secured at intermediate points thereof.

5. A steering head for a child's vehicle comprising a pair of one piece tubular combined fork and handle portions, each of which is formed of a single continuous piece of metal tubing having a fork portion of substantially elliptical cross section and a supporting portion, and a handle portion, both of substantially circular cross section, said handle portion being continuously curved forwardly, outwardly and rearwardly with respect to said fork and supporting portions, and a connecting bracket to which said combined parts are rigidly secured at intermediate points thereof.

In testimony whereof we have hereunto affixed our signatures.

OTTO W. SIEBERT.
CARL J. BJORSON.